(12) United States Patent
Thomas et al.

(10) Patent No.: US 7,654,610 B2
(45) Date of Patent: Feb. 2, 2010

(54) APPARATUS FOR MOUNTING AN ARTICLE ASTRIDE FIXED AND MOVABLE BODY COMPONENTS

(75) Inventors: Bob Thomas, North Hollywood, CA (US); Jack E. Brown, Rochester Hills, MI (US); Robin Krieg, Leamington Spa (GB)

(73) Assignee: GM Global Technology Operations, Inc., Detroit, MI (US)

( * ) Notice: Subject to any disclaimer, the term of this patent is extended or adjusted under 35 U.S.C. 154(b) by 143 days.

(21) Appl. No.: 11/840,249

(22) Filed: Aug. 17, 2007

(65) Prior Publication Data
US 2009/0045642 A1 Feb. 19, 2009

(51) Int. Cl.
*B62D 25/00* (2006.01)
(52) U.S. Cl. .................................. 296/198; 296/146.9
(58) Field of Classification Search .............. 296/146.1, 296/146.9, 146.11, 146.12, 207.4; 292/336.3, 292/DIG. 31, DIG. 30; 49/460, 502
See application file for complete search history.

(56) References Cited

U.S. PATENT DOCUMENTS

| | | | |
|---|---|---|---|
| 3,095,600 A * | 7/1963 | Bretzner ................... | 16/224 |
| 6,007,141 A | 12/1999 | Thomas et al. | |
| 7,152,893 B2 * | 12/2006 | Pudney ..................... | 292/336.3 |
| 7,431,357 B2 * | 10/2008 | Pudney ..................... | 292/336.3 |
| 2007/0257505 A1 * | 11/2007 | Tseng et al. ............. | 296/97.22 |

OTHER PUBLICATIONS

Campbellot Solar Assisted 2000 Chevrolet S-10 Electric vehicle, website: "http://www.campbellot.com/electric-s10/" of Lee Cambell, San Diego, CA, last updated Sep. 14, 2006. 10 pages, see particularly p. 5.
"Charge Across America" website: "http://www.kingoftheroad.net/charge_across_america/charge_html/chargehome.html" of Kris Trexler, believed dated 1998, 7 pages., see particularly p. 6.
"Mustang Accessories, Power Outlet Plug" website: "http://www.mgwltd.com/mustang2005_power_outlet_plug.shtml" of MGW, Ltd of Augusta, GA, believed dated 2006, 2 pages.

* cited by examiner

*Primary Examiner*—Patricia L Engle
*Assistant Examiner*—Pinel E Romain

(57) ABSTRACT

A mounting apparatus for an article astride fixed and movable body components in bridging relation to the cut-line therebetween. The article is automatically pivoted with respect to the fixed body component in concert with movement of the movable body component, whereby the pivoting of the article ensures that the movement of the movable body component with respect to the fixed body component avoids contact and interference with the article. For example, an article astride a fender and a door of a motor vehicle, the article transversely pivots out of the way of the door whenever the door is opened.

20 Claims, 3 Drawing Sheets

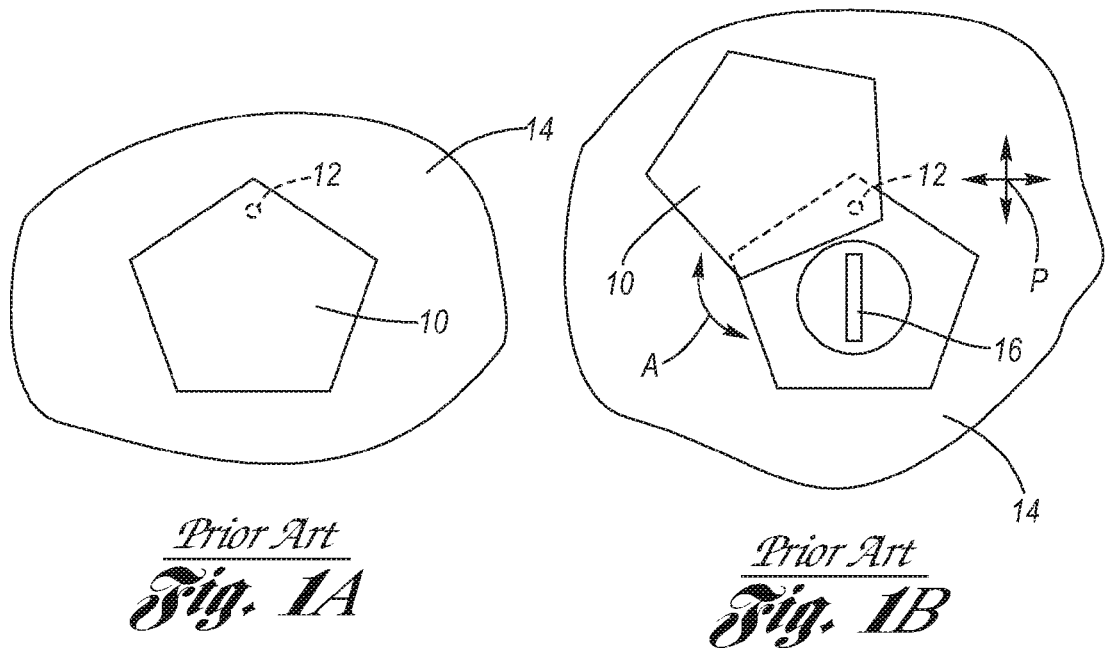
Prior Art
Fig. 1A
Prior Art
Fig. 1B
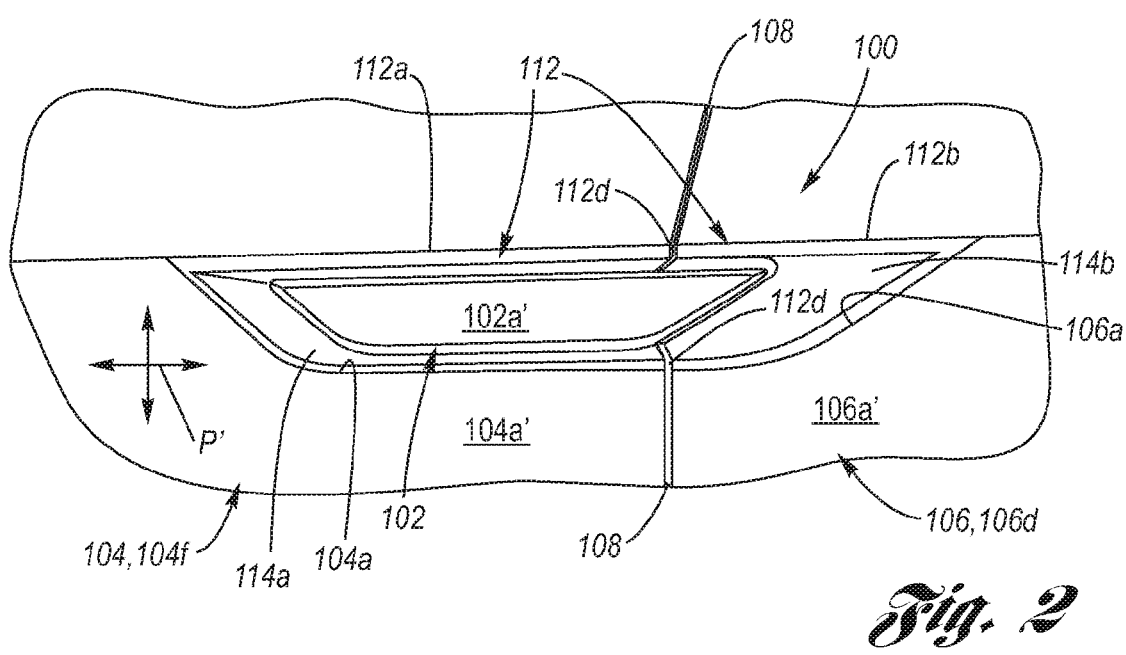
Fig. 2

APPARATUS FOR MOUNTING AN ARTICLE ASTRIDE FIXED AND MOVABLE BODY COMPONENTS

TECHNICAL FIELD

The present invention relates to articles used in the styling of motor vehicles, as for example vents, badges, emblems, covers, moldings, etc. Still more particularly, the present invention relates to a pivotally mounted article astride movable and fixed body components, as for example in straddling relation across the cut-line between a fender and a door.

BACKGROUND OF THE INVENTION

Motor vehicle design includes a range of ornamentation, badges, emblems, vents, moldings and other articles which are integrated with body components of the vehicle.

Articles in the form of badges, emblems, and the like are used in the automotive arts to provide identification (i.e., model and make monikers) and/or ornamentation, which are placed on the anterior (externally visible side) of body components of the vehicle. It is known in the art to provide badges and emblems with not only a fixed attachment, but a pivoting attachment, wherein the pivoting occurs parallel to the local plane of the body component. For example, FIGS. 1A and 1B depict a pivotally mounted badge/emblem which was used in the 1982 Chrysler New Yorker (motor vehicle product of former Chrysler Corporation, now DaimlerChrysler of Auburn Hills, Mich.). As shown at FIG. 1A, the badge/emblem 10 is pivotally mounted on a pivot 12 on the rear trunk lid 14. When the badge/emblem 10 is laterally pivoted along arrow A (by "lateral" is meant parallel to the local plane P of the trunk lid 14), as shown at FIG. 1B, revealed is a feature of the motor vehicle in the form of the trunk lock release keyway 16.

It is also known in the automotive art to utilize transversely pivoting covers for providing selective access to features of the motor vehicle such as a fuel filler cap and charge jack (as in the General Motors Corporation of Detroit, Mich. model EV1 of 1998), and it is further known to associate a motor vehicle charge jack with an emblem of the motor vehicle.

In the prior art, articles are attached, whether in a fixed relation or a pivoting relation, exclusively to one or the other of a fixed or movable body component. Even though styling technique has become ever more developed and creative, one aspect of body component design that has remained beyond the skill of designers is how to mount a single piece, rigid article astride (i.e., in straddling, spanning or bridging relation) with respect to both a fixed body component and a movable body component, wherein the article is disposed across the cut-line therebetween. Such an article mounting has heretofor been an impossibility because if a rigid article was to somehow be mounted astride both fixed and movable body components across the cut-line therebetween, such a disposed article would damagingly contact the movable body component and interfere with the relative movement of the movable body component with respect to the fixed body component. The only avenue stylists have in this regard is to simulate installation of an article astride fixed and movable body components by providing a simulated article composed of two separated article pieces: one article piece being affixed to the fixed body component and another article piece being affixed to the movable body component, each article piece being juxtaposed the cut-line such that a separation between the article pieces is located superposed the cut-line between the fixed and movable body components.

Accordingly, what remains needed in the art is to somehow provide an apparatus for mounting an article simultaneously astride both fixed and movable body components which does not interfere with relative movements therebetween.

SUMMARY OF THE INVENTION

The present invention is a mounting apparatus for an article in which the article is mounted astride both a fixed body component and a movable body component, as for example astride a front fender and its adjoining door. The article is disposed so as to bridge across the cut-line therebetween, wherein the article is automatically pivoted with respect to the fixed body component responsive to movement of the movable body component such that the pivoting of the article ensures that as the movable body component moves with respect to the fixed body component, interference by the article with respect to the movement of the movable body component is prevented and contact between the article and the movable body component is avoided.

The mounting apparatus according to the present invention includes a fixed body component having an opening formed therein; an article, preferably being of a single piece, rigid construction, pivotally mounted to the fixed body component at the opening; a movable body component adjacent the fixed body component, wherein at a seated position of the article, the article is disposed astride both the fixed and movable body components and bridges the cut-line therebetween; and a linkage apparatus interconnected between the posterior of the article and the posterior of the movable body component, wherein the linkage apparatus automatically causes the article to pivot in response to movement of the movable body component such that there is an absence of interference with the movement of the movable body component and an absence of mutual contact therebetween during the movement. The pivoting of the article is preferably in generally transverse relation to the local plane of the fixed body component.

In operation, when the movable body component is moved from its rest position to another position relative to the fixed body component, as for example when a front door is rotated open on its hinge from its closed position, the linkage apparatus automatically causes the article to pivot generally transversely out of the seated position, wherein the pivoting movement is generally in unison with the movement of the movable body component such that as the article pivots, a portion thereof into the opening of the fixed body component and another portion thereof away from the movable body component, the article avoids contact with the movable body component and keeps out of interference with the movement of the movable body component. As the movable body component is returned to its rest position (i.e., the door is rotated closed), the linkage apparatus returns the article to its original seated position at a rate such that contact between the article and the movable body component is always avoided whenever the movable body component is at other than its rest position.

Accordingly, it is an object of the present invention to provide an apparatus for mounting an article simultaneously astride both fixed and movable body components in bridging relation to the cut-line therebetween, wherein the article pivots so as to be always remain out of interference with relative movements of the movable body component with respect to the fixed body component.

This and additional objects, features and advantages of the present invention will become clearer from the following specification of a preferred embodiment.

BRIEF DESCRIPTION OF THE DRAWINGS

FIGS. 1A and 1B are schematic depictions of a prior art movable emblem having a feature of the motor vehicle selectively hidden therebehind.

FIG. 2 is a perspective, anterior view of the article mounting apparatus according to the present invention, showing the article at its seated position and the movable body component at its rest position.

DESCRIPTION OF THE PREFERRED EMBODIMENT

Figure 3:
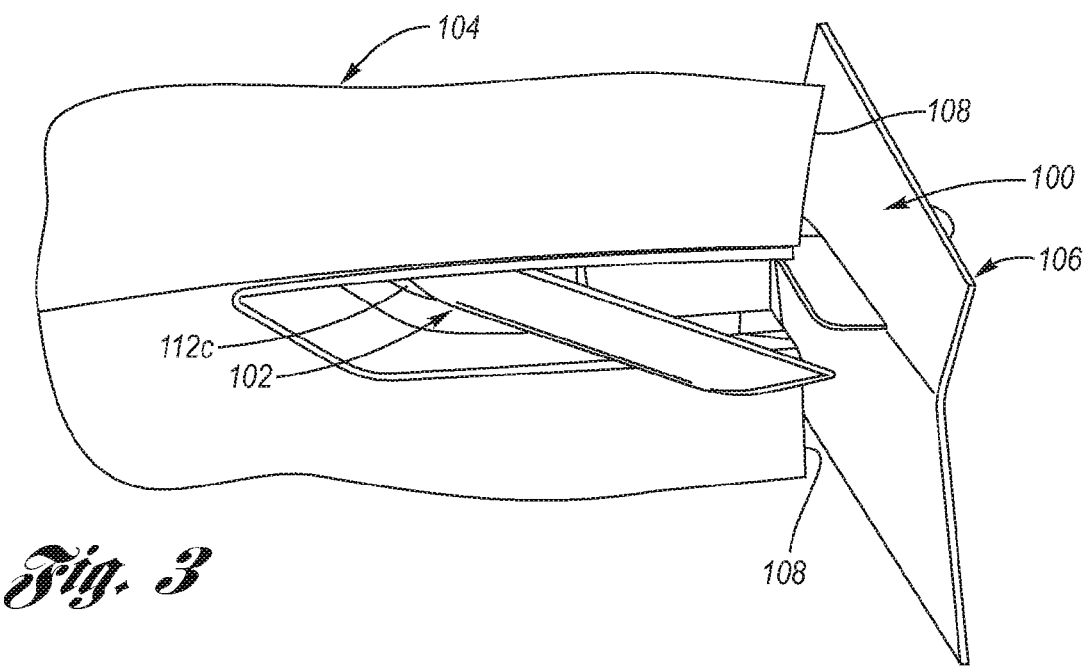
FIG. 3 is a perspective view as in FIG. 2, wherein now the article is shown pivoted out of its seated position in response to the movable body component being moved out of its rest position, wherein the article is pivotably positioned out of interference with the movable body component.

Referring now to the Drawing, FIGS. 2 through 7 depict an example of an article mounting apparatus 100 according to the present invention.

As shown at FIG. 2, an article 102 is disposed astride a fixed body component 104 (as for non-limiting example, a front fender 104f of a motor vehicle) and a movable body component 106 (as for non-limiting example, a door 106d of the motor vehicle, wherein the door has its hinge adjacent, and/or connected with, the front fender), wherein a cut-line 108 is present between the fixed and movable body components, and wherein the article bridges the cut-line. The article 102 may be, for non-limiting example, a badge, emblem, vent, molding, decoration, etc. The article 102 is preferably a single piece and is preferably rigid, but in any case the article bridges (in other words spans, extends across, straddles) the cut-line 108 without, itself, thereat having a cut-line formed therein.

Figure 5:
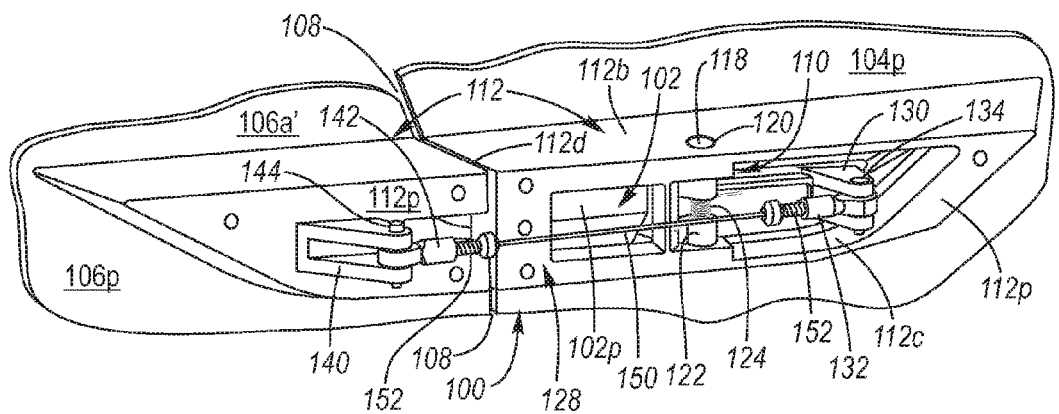
FIG. 5 is a perspective, posterior view of the article mounting apparatus according to the present invention, showing the article at its seated position and the movable body component at its rest position, showing in particular the preferred linkage apparatus.
Figure 6:
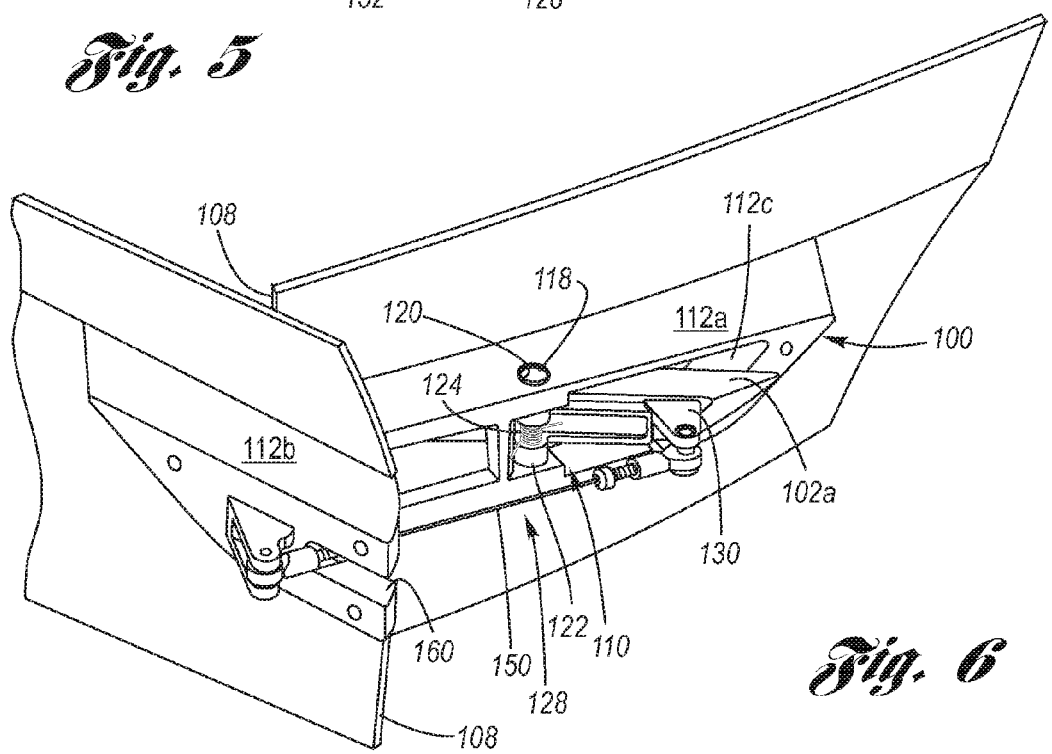
FIG. 6 is a perspective view as in FIG. 5, wherein now the article is shown pivoted out of its seated position in response to the movable body component being moved out of its rest position, wherein the article is pivotally positioned out of interference with the movable body component via the preferred linkage apparatus.
Figure 7:
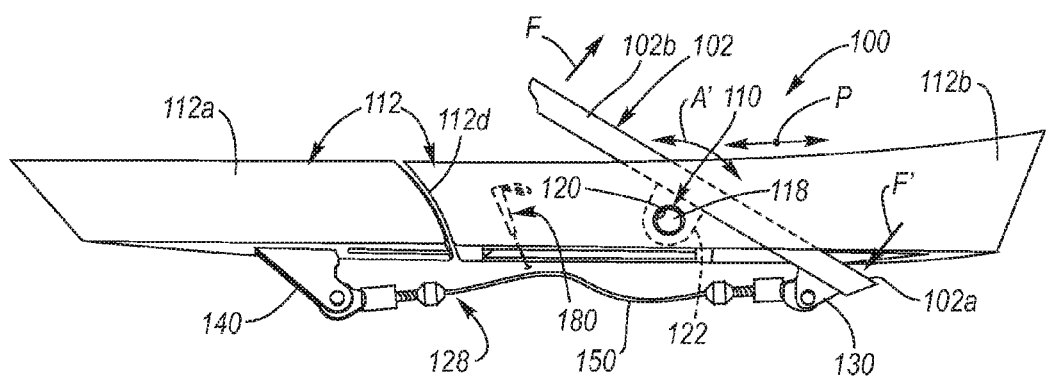
FIG. 7 is a partly sectional side view of the article mounting apparatus, now showing the article manually pivoted out of its seated position, while the movable body component remains at its rest position, in order to gain selective access to a feature of the motor vehicle hidden therebehind.

The article 102 is pivotally connected by a pivot 110 with respect to the fixed body component 104 (shown best at FIGS. 5 through 7). The pivoting of the article 102 via the pivot 110 is generally transverse with respect to the local plane P' of the fixed body member 104. In this regard, the fixed body component 104 has a first body opening 104a, wherein the pivoting of the article involves a first article portion 102a passing into the first body opening.

Preferably, a bezel 112 is provided for seating the article 102 astride the fixed and movable body components 104, 106, wherein a first bezel member 112a is affixed, as for example by welding or adhesive, to the fixed body component at the first body opening 104a, and a second bezel member 112b is affixed, also as for example by welding or adhesive, to the movable body component at a second body opening 106a thereof, wherein a bezel cut-line 112d is provided between the first and second bezel members which is disposed in coinciding relation with respect to the cut-line 108 between the fixed and movable body components. In this regard, the pivot 110 is located at the first bezel member 112a and thereby provides its attachment to the fixed thereto at the anterior of the bezel member 114 and the anterior of the fixed and movable body components 104, 106 (see FIG. 2). The first bezel member 112a further has a pivot opening 112c which communicates with the article seat 114a and is superposed by the first body opening 104a.

Figure 4:
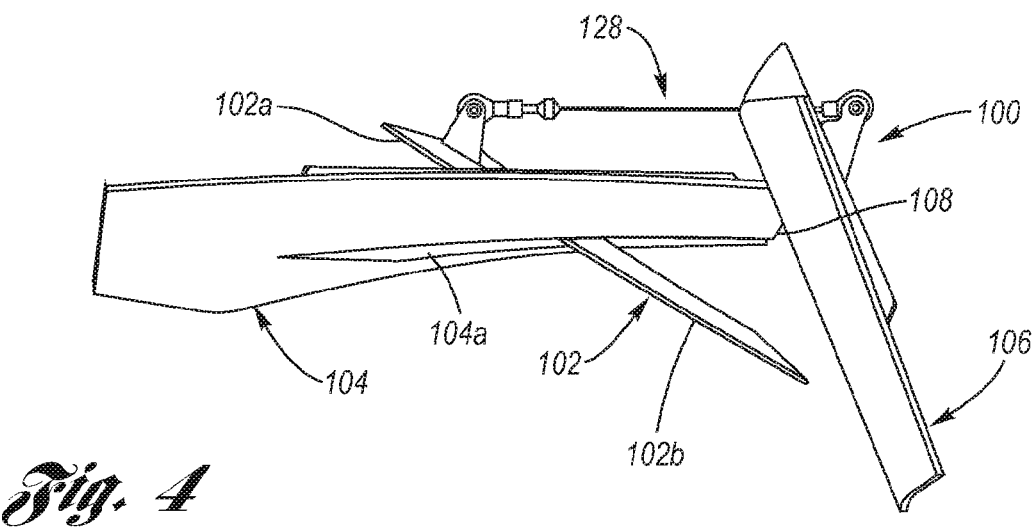
FIG. 4 is a perspective view similar to that of FIG. 3, now also partly showing a posterior view, including a preferred linkage apparatus according to the present invention.

As best shown at FIG. 5, the article 102 is pivotally connected to the first bezel member 112a via the above mentioned pivot 110, wherein the pivot is, for example, disposed at the posterior of the article and the posterior of the first bezel member. By way of exemplification, a pivot pin 118 passes through sleeve lined pivot holes 120 in a pivot clevis 122 at the posterior of the article 102. The pivot 110 is disposed such that the article 102 pivots along arrow A' on the pivot pin 118 in generally transverse relation to the local plane P' of the fixed body component (see FIG. 7) such that the first article portion 102a on one side of the pivot passes through the pivot opening 112c (and the first body opening 104a), while a second article portion from the movable body component, as best shown at FIGS. 3, 4 and 6.

As best shown at FIG. 2, when the article 102 is at its seated position the anterior 102a' of the article is disposed at the anterior 104a' 106a' of the fixed and movable body components 104, 106 and also at the anterior 112a' of the bezel 112, and is disposed, by way of exemplification per the depictions in FIGS. 2 through 7, in generally parallel relation to the fixed and movable body components with the fixed body component being at its rest position.

At the posterior 102p of the article 102 and the posterior 106p of the movable body component 106 is a linkage apparatus which interconnects the article with the movable body component. The linkage apparatus may take any form so long as when the movable body component moves, the article is caused to automatically pivot in response to the movement such that during the movement of the movable body component the article avoids contact with the movable body component and does not interfere with its movement, wherein a preferred linkage apparatus 128 is depicted at FIGS. 4 through 7 merely by way of exemplification which includes a flexible link 150 and cooperating biasing device 128.

As best shown at FIG. 5, at the posterior 104p of the fixed body component and at the posterior 112p of the bezel 112, the posterior 102p of the article 102 has an article stanchion 130 upstanding therefrom at the first article portion 102a, which passes out through the pivot opening 112c. In the preferred embodiment, the article stanchion 130 is in the form of a clevis having at its end a pivotally mounted first stem 132, as for example via a pin 134 passing therethrough.

As also best shown at FIG. 5, at the posterior 106p of the movable body component is a movable body stanchion 140, preferably located at the posterior 112p of the bezel 112 which is upstanding therefrom. In the preferred embodiment, the movable body stanchion 140 is also in the form of a clevis having at its end a pivotally mounted second stem 142, as for example via a pin 144 passing therethrough.

Connecting between the first and second stems 132, 142 is a flexible link 150, a preferred example of which being a braided metal cable. At least one of the first stem 132 and the second stem 142 is a threaded adjustment device (i.e., a turnbuckle) 152 which allows for the ends of the flexible link 150 to be made generally taut when the movable body component 106 is at its rest position and the article 102 is at its seated position, as shown at FIG. 5. A slot 160 (which is superposed by the second body opening 106a) is provided in the second bezel member 114b, as can be seen at FIGS. 5 and 6, which allows for accommodation of the flexible link 150 when the movable body component is moved out of its rest position and, in concert therewith, the article is moved out of its seated position, as shown best at FIG. 6.

The biasing device 124, as for example a spring, as shown at FIGS. 5 and 6, biases the article 102 into a seated position in relation to the article seats 114a, of the seated position requires application of a force (torque) to overcome the biasing force (torque) of the biasing device 124. The biasing device 124 cooperates with the flexible link 150 such that the return pivoting of the article under the biasing is regulated by the flexible link.

In operation of the article mounting apparatus 100, when the movable body component 106 is moved from its rest position to another position relative to the fixed body component 104 (as for example when a front door 106d is rotated open on its hinge from its closed position with respect to a front fender 104f), the linkage apparatus 128 causes the article to automatically pivot out of the seated position of FIGS. 2 and 5, against the biasing force (torque) of the biasing device 124, wherein the pivoting is generally in unison with the movement of the movable body component such that as the article is pivoted, the first article portion 102a pivots into the pivot opening 112c and the second article portion 102b pivots away from the movable body component, whereby the article always avoids contact with the movable body component whenever the movable body component is at other than its rest position, and always avoids any possibility of interference by the article with the movement of movable body component, as depicted at FIGS. 3, 4 and 6.

As the movable body component is returned to its rest position (i.e., the door is rotated closed), the biasing force (torque) of the biasing device returns the article to its original seated position (FIGS. 2 and 5). In this regard, the flexible link 150 keeps the article from pivoting back freely, whereby the rate of its return pivoting under urgency of the biasing device is kept in general unison with the rate of return movement of the movable body component such that always contact and interference are avoided as between the article and the movable body component.

FIG. 7 shows an exemplification of a further operational aspect of the article mounting apparatus 100, namely to provide selective access to at least one hidden feature of the motor vehicle.

Even though the movable body component 106 remains at its rest position, the article 102 can be pivoted on its pivot 110 by applying a pulling force F or a pressing force F' upon a selected end thereof so as to apply a force (torque) which overcomes the biasing force (torque) of the biasing device 124, wherein the flexible link 150 goes from taut to slack. In this regard, it is to be noted that this pivoting is performed independently of movement of the movable body component, as indicated by the slackness of the flexible link 150. Thus, a manual application of an applied force, either F or F' respectively applied to one or the other of the first and second article portions, results in a pivoting torque acting against, and in excess of, the biasing of the biasing device 124. The manual, non-automatic pivoting of the article is performed in order to reveal and provide access to a feature 180 of the motor vehicle disposed at the posterior of the article (i.e., disposed therebehind), as for example a release latch for a hood latch mechanism of the motor vehicle (depicted), also as for preferable example a charge jack of an electric or hybrid motor vehicle. When the manually applied force that caused the pivoting torque is removed (i.e., stopped or otherwise taken away), the biasing device returns the article 102 to its seated position, wherein the removal of the (manually) applied force is preferably, but not necessarily, gradual.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. Apparatus for mounting an article astride fixed and movable body components, comprising:
    a fixed body component;
    a movable body component disposed adjacent said fixed body component, wherein a cut-line exists between said fixed and movable body components, and wherein said movable body component is movable with respect to said fixed body component including a rest position of said movable body component;
    an article disposed astride both of said fixed and movable body components; and
    a pivot pivotally connecting said article to said fixed body component, said article being pivotal with respect to said fixed body component including a seated position of said article;
    wherein said article is pivotal on said pivot so as to always be free of interfering with the movement of said movable body component, and wherein said article is at said seated position bridging said cut-line when said movable body component is at said rest position.

2. The apparatus of claim 1, wherein said pivoting of said article is generally transverse in relation to a local surface of said fixed body component, and wherein said fixed body component has a first body opening into which a portion of said article transversely pivots.

3. The apparatus of claim 2, wherein said article has an anterior and a posterior; said apparatus further comprising a selected feature disposed at said posterior, wherein a selected force applied to said article provides transverse pivoting of said article to thereby provide access to said feature independently of movement of said movable body component.

4. The apparatus of claim 2, further comprising a linkage apparatus connected to said article and said movable body component such that said article pivots on said pivot in automatic response to movement of said movable body component with respect to said fixed body component, wherein said article is free of contact with the movable body component whenever said movable body component is at other than its rest position.

5. The apparatus of claim 4, wherein said linkage apparatus comprises:
    a biasing device connected with said article and said fixed body member, wherein said biasing device biases said article toward said seated position; and
    a flexible link connecting between said movable body component and said article.

6. The apparatus of claim 5, wherein said article has an anterior and a posterior; said apparatus further comprising a selected feature disposed at said posterior, wherein a selected force applied to said article overcomes said biasing and provides transverse pivoting of said article to thereby provide access to said feature independently of movement of said movable body component.

7. The apparatus of claim 5, further comprising a bezel, said bezel comprising:
  a first bezel member connected to said fixed body component at said first body opening, wherein said pivot is connected to said first bezel member, and wherein said first bezel member has a pivot opening into which a portion of said article is transversely pivotal; and
  a second bezel member connected to said movable body component at a second body opening thereof;
  wherein a bezel cut-line separates said first and second bezel members, and wherein said bezel cut-line is disposed in coinciding relation with respect to said cut-line between said fixed and movable body components; and
  wherein said first and second bezel members have an article seat formed therein at which said article is disposed when said article is at said seated position.

8. The apparatus of claim 7, wherein said second bezel member has a slot which receives said flexible link when said movable body component is moved from said rest position.

9. The apparatus of claim 8, wherein said fixed body component comprises a fender of a motor vehicle; and wherein said movable body component comprises a door of the motor vehicle.

10. The apparatus of claim 8, wherein said article has an anterior and a posterior; said apparatus further comprising a selected feature disposed at said posterior, wherein a selected force applied to said article overcomes said biasing and provides transverse pivoting of said article to thereby provide access to said feature independently of movement of said movable body component.

11. Apparatus for mounting an article astride fixed and movable body components of a motor vehicle, comprising:
  a fixed body component comprising a fender;
  a movable body component comprising a door, said door being disposed adjacent said fender, wherein a cut-line exists between said fender and said door, and wherein said door is movable with respect to said fender between a selectively open position and a closed position;
  an article disposed astride both of said fender and said door, said article bridging said cut-line when said door is at said closed position;
  a pivot pivotally connecting said article to said fender; and
  a linkage apparatus connected to said article and said door such that said article pivots on said pivot in automatic response to the opening of said door, wherein said article is free of interference with the opening of said door;
  wherein said pivoting of said article is generally transverse in relation to a local surface of said fender; and
  wherein said fender has a first body opening into which a portion said article transversely pivots.

12. The apparatus of claim 11, wherein said article has an anterior and a posterior; said apparatus further comprising a selected feature of the motor vehicle disposed at said posterior, wherein a selected force applied to said article provides transverse pivoting of said article to thereby provide access to said feature independently of movement of said door.

13. The apparatus of claim 11, wherein said linkage apparatus comprises:
  a biasing device connected with said article and said fender, wherein said biasing device biases said article toward said seated position; and
  a flexible link connecting between said door and said article;
  wherein said article is free of contact with said door whenever said door component is at other than its closed position.

14. The apparatus of claim 13, further comprising a bezel, said bezel comprising:
  a first bezel member connected to said fender at said first body opening, wherein said pivot is connected to said first bezel member, and wherein said first bezel member has a pivot opening into which said portion of said article is transversely pivotal; and
  a second bezel member connected to said door at a second body opening thereof
  wherein a bezel cut-line separates said first and second bezel members, and wherein said bezel cut-line is disposed in coinciding relation to said cut-line between said fender and said door; and
  wherein said first and second bezel members have an article seat formed therein at which said article is disposed when said article is at said seated position.

15. The apparatus of claim 14, wherein said second bezel member has a slot which receives said flexible link when said door is opened.

16. The apparatus of claim 15, wherein said article has an anterior and a posterior; said apparatus further comprising a selected feature of the motor vehicle disposed at said posterior, wherein a selected force applied to said article overcomes said biasing and provides transverse pivoting of said article to thereby provide access to said feature independently of movement of said door.

17. A method for attaching an article astride fixed and movable body components in bridging relation to a cut-line therebetween, comprising the steps of:
  providing a fixed body component;
  providing a movable body component disposed adjacent the fixed body component, wherein a cut-line exists between the fixed and movable body components, and wherein the movable body component is movable with respect to the fixed body component including a rest position of the movable body component;
  pivotally attaching an article to the fixed body component, the article being disposed astride the fixed and movable body components in bridging relation to the cut-line when the article is at a seated position and the movable body component is at the rest position;
  moving the movable body component in relation to the fixed body component; and
  pivoting the article simultaneously with said moving in automatic response to the moving so that the article remains always free of interference with respect to the moving of the movable body component.

18. The method of claim 17, wherein the responsive pivoting of the article is such that the article is always free of contact with the movable body component whenever the movable body component is at other than its rest position.

19. The method of claim 18, further comprising:
  biasing the article resiliently toward the seated position.

20. the method of claim 19, further comprising:
  providing a feature disposed posteriorly in relation to the article when the article is at the seated position; and
  applying a force upon the anterior of the article to cause the article to pivot and thereby reveal the feature independent of moving of the movable body component.

* * * * *